United States Patent [19]

Arnold et al.

[11] Patent Number: 4,864,630
[45] Date of Patent: Sep. 5, 1989

[54] METHOD AND APPARATUS FOR READING DATA PAGES ON A DATA SURFACE

[75] Inventors: Joseph B. Arnold; Jerome Drexler, both of Los Altos Hills, Calif.

[73] Assignee: Drexler Technology Corporation, Mountain View, Calif.

[21] Appl. No.: 136,895

[22] Filed: Dec. 22, 1987

Related U.S. Application Data

[63] Continuation-in-part of Ser. No. 892,221, Jul. 30, 1986, Pat. No. 4,745,484.

[51] Int. Cl.$^4$ ............................................. G06K 9/32
[52] U.S. Cl. .................................... 382/46; 382/44; 382/48
[58] Field of Search ........................ 382/44, 46, 48, 45

[56] References Cited

U.S. PATENT DOCUMENTS

| | | | |
|---|---|---|---|
| 3,806,643 | 4/1974 | Russell | 178/178 |
| 4,233,625 | 11/1980 | Altman | 382/44 |
| 4,260,979 | 4/1981 | Smith | 382/44 |
| 4,581,649 | 4/1986 | Morokawa | 358/212 |
| 4,588,261 | 5/1986 | Erhardt | 350/167 |
| 4,611,232 | 9/1986 | Searby | 382/46 |
| 4,757,550 | 7/1988 | Uga | 382/48 |

Primary Examiner—Leo H. Boudreau
Assistant Examiner—Yonnie Jung
Attorney, Agent, or Firm—Thomas Schneck

[57] ABSTRACT

A method and apparatus for optically reading data in a substantially planar data field having a plurality of pages arranged in series of rows and columns. Each page is spaced apart from adjacent data pages by alignment-indicating streets, which are data-free blank areas. A CCD area array is positioned and spaced apart in generally parallel relation to the data field. The CCD area array is then moved linearly so that the array is opposite a data page to be read. An initial imaging thereafter takes placed in order to recognize the streets bordering a data page. Through recognition of the streets, a processor resolves the orientation of the data page relative to the CCD area array. The processor then transmits a command signal to a control circuit for rotational adjustment of the imaging of the data page.

16 Claims, 2 Drawing Sheets

METHOD AND APPARATUS FOR READING DATA PAGES ON A DATA SURFACE

CROSS REFERENCE TO RELATED APPLICATION

This application is a continuation-in-part of application Ser. No. 892,221, filed July 30, 1986, now U.S. Pa. No. 4,745,484.

TECHNICAL FIELD

The present invention relates to methods and optical apparatus for reading data patterns on surfaces with optical detector arrays and in particular to methods and apparatus using CCD area arrays.

BACKGROUND ART

In optical data storage, micron size and larger bits, spots or other marks representing data bits are melted, oblated, embossed or otherwise marked on the surface of an optical data storage medium. The data may then be read with a photodiode detector or linear CCD array which images data spots illuminated by a laser or light emitting diode (LED) light beam or other illuminating source. Usually either the emitting beam or the data storage medium is moved relative to the other so that the data may be scanned.

For data recordings which are linked and yet distinct, separate recordings may be disposed upon a data field of a medium with each recording contained within a data page. For example, a data page may have dimensions of 1 mm × 1 mm, with 100 rows having as many as 100 data bits in each row. The data bits are contained within data cells in the order of 1 micron up to 100 microns with 10 microns being a preferred size. Thus, more than 2000 data pages may be arranged in rows and columns on a surface the size of a credit card. U.S. Pat. No. 3,806,643 to Russell teaches a method for reading data pages. A single row of microlenses is positioned behind a data field in a laser beam and scanned horizontally to illuminate the first line of each data page across the data field. This illumination of a line is transmitted to the row of microlenses whereafter the data field is caused to be moved vertically for reading of a second line of the data pages. The lines of the illuminated pages are transmitted seriatim to the row of microlenses. Because of the size of the data bits involved, it is imperative that any skew of the microlenses relative to the data field be kept within extremely tight tolerances.

The charge-coupled device (CCD) is a device which was originally developed for military use but has become increasingly popular for scientific applications. The CCD is the functional equivalent of electronic film. The CCD is made up of an array of detector cells, also known as pixels or picture elements. When exposed to light, electrons accumulate at each pixel as electron-hole pairs are generated within the CCD. The generation of electron-hole pairs is in direct proportion to the intensity of the light received. Electrons which are accumulated in the various pixels are then transferred out in a process referred to as "charge-coupling".

The problem with use of a CCD is that imaging of data must be both photometrically and geometrically extremely accurate. For example, a CCD area array of 360,000 picture elements disposed in 600 rows of 600 picture elements each must not be skewed relative to the surface to be read. In reading a data page, such a CCD area array could read an entire data page but imaging of the data page would require that the peripheral edges of the CCD area array be kept parallel the peripheral edges of the data page. The prior art insures proper alignment by keeping the manufacture of the data field to be read and the equipment for reading the data field within extremely tight tolerances. This degree of precision is not practical when dealing with data bits in the range of 1 to 10 microns.

It is an object of the present invention to devise a method and apparatus for reading a data surface in a manner which insures proper orientation of CCD imaging.

DISCLOSURE OF THE INVENTION

The above object has been met with a method of reading optical data written in area wise patterns for which any skew in imaging is readily redressed. This is accomplished by a preliminary reading of a data field with an area detector array, and by recognition of blank areas, termed "streets", bordering data sub-areas imaged during the preliminary reading. Through recognition of the streets it is possible to determine the orientation of the data field relative to the CCD area array, whereafter imaging may be adjusted in a rotational manner to compensate for the difference between the orientation and a desired orientation.

In a preferred embodiment the present method and apparatus reads sub-areas as data pages, symmetrically arranged in a plurality of rows and columns. As many as 2000 such data pages may be disposed on a data surface the size of a credit card. Each data page is spaced apart from adjacent data pages by streets, serving as borders therebetween. The method and apparatus, however, may also be used to read a single, larger data page covering nearly the entirety of a data field.

A CCD area array is initially positioned parallel to a data medium having a data field. The CCD area array is then caused to move linearly across the data field to a location opposite a data page to be read. An initial imaging of the data page onto the CCD area array serves two functions. First, each data page includes a unique identifying address. The initial imaging insures that the CCD area array is in position to read the proper data page. Secondly, the initial imaging recognizes the streets surrounding the data page. The recognition of the streets is used to resolve the orientation of the data page relative to the CCD area array. Assuming that the correct data page is opposite the CCD area array, the imaging is adjusted to obtain the desired image orientation. Typically, both the data page and the CCD area array have a rectangular configuration, in which case adjustment may be made by rotating the data page and the CCD area array with respect to each other so that corresponding sides are parallel. The image adjustment, however, may be accomplished by rotating the image in memory.

The optical apparatus for reading the data field includes a planar CCD area array having a two dimensional array of picture elements. A chuck or the like for holding a data surface is spaced apart from and generally parallel to the array. The CCD area array and the data surface are moved relative to each other for reading of a particular data page within the data surface. A lens or a lenticular array located between the CCD area array and the data surface images the data page onto the array. A processor in communication with the CCD area array receives the image and recognizes both the address and the streets adjacent the data page. The processor then provides information to a control circuit which aligns the CCD area array for reading of the desired data page.

An advantage of the present method and apparatus is that the CCD area array is able to read an entire data page without mechanically scanning data, thereby providing a faster, less expensive, more compact and durable reader. Moreover, it is possible to utilize a plurality of detector cells in a CCD area array to image each data bit in a data page. By having a plurality of detector cells observe each data bit, error resulting from crosstalk or other sources is minimized. The present invention is able to provide proper alignment for imaging without requiring that all movement of a data medium or a CCD area array be done within extremely close tolerances.

BEST MODE FOR CARRYING OUT THE INVENTION

Figure 1:
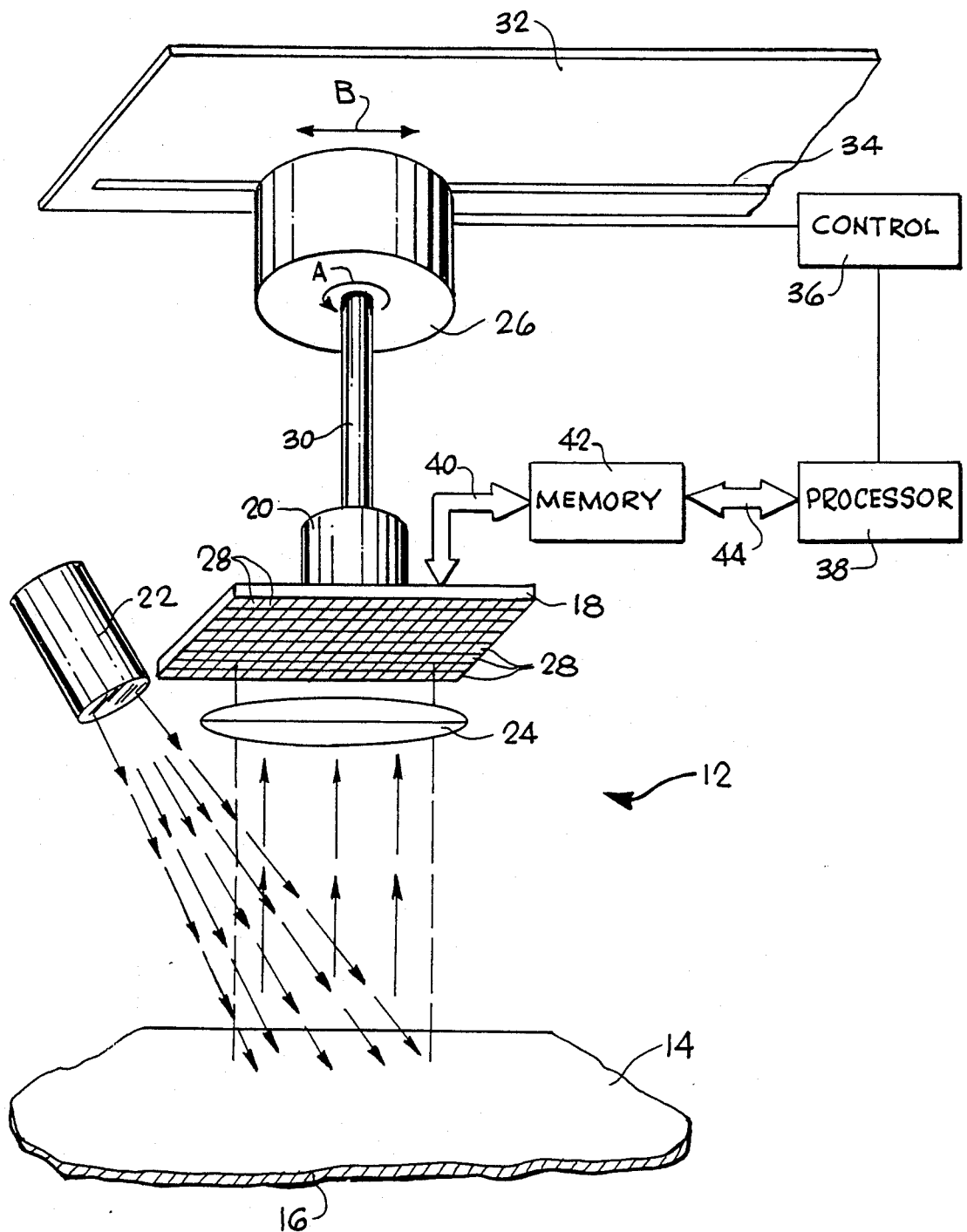
FIG. 1 is a perspective view of an optical apparatus of the present invention reading data on a data surface.

With reference to FIG. 1, an optical apparatus 12 is provided for reading data in a data field 14 of a storage medium 16. This storage medium 16 is an optical recording medium supported on a wallet-size card, but the size of the card is not critical. The optical apparatus 12 comprises a CCD area array 18, a locking device 20 for holding the array 18, a light source 22, imaging optics represented by lens 24, and a motor 26.

CCD area array 18 is a semiconductor chip with a light sensitive grid made up of a plurality of photodiodes, phototransistors or other light sensitive picture elements 28 coupled together. Picture elements 28 are also referred to as pixels or detector cells. CCD area arrays are known and a 360,000 element array produced by Sony Corp. is a typical array which may be used with this invention. Imaging optics represented by lens 24 may be a single lens, or alternatively, may be a lenticular array. Lenticular arrays are known and are exemplified by the imager in the U.S. Pat. No. 4,588,261 to Erhardt. The optical apparatus may also have a zoom lens arrangement, i.e. imaging optics with variable magnification, so as to aid in the reading of a data field 14.

Locking device 20 holds the CCD area array 18 in a data reading position which is spaced apart from and generally parallel to the data field 14. The locking device 20 is suspended the motor 26 by a motion transfer rod 30. Motor 26 will rotate the motion transfer rod 30, as shown by arrow A. Thus, the CCD area array 18 will rotate relative to the data field 14. Moreover, the motor 26 is suspended from a planar surface 32 having a longitudinal slot 34. The motor 26 is able to move along the length of the longitudinal slot, as indicated by arrow B to provide motion of the CCD area array 18 relative to the data field 14. Linear motion along longitudinal slot 34, as well as rotational motion about the axis defined by the motion transfer rod 30, is governed by a control circuit 36. The control circuit 36, in turn, receives command signals from a processor 38.

The light source 22 is typically a laser which generates radiation directed toward the data field 14 of the storage medium 16. For example, the light source 22 may be a semiconductor laser operating at infrared wavelengths. Light is reflected from data field 14 and is thereby directed towards lens 24 for focusing at the CCD area array 18. Imaging is provided by the generation of electron-hole pairs within the CCD area array 18 as the array is exposed to light. The electron-hole pairs are generated in direct proportion to the intensity of light striking each picture element 28. Electrons are collected at each picture element to produce an electric potential well. Creation of an electric potential well at each picture element provides the functional equivalent to electronic film. The readout from the CCD area array 18 is transferred via a bus line 40 to a memory 42. The memory 42 and processor 38 are in communication by means of a bus line 44.

Figure 2:
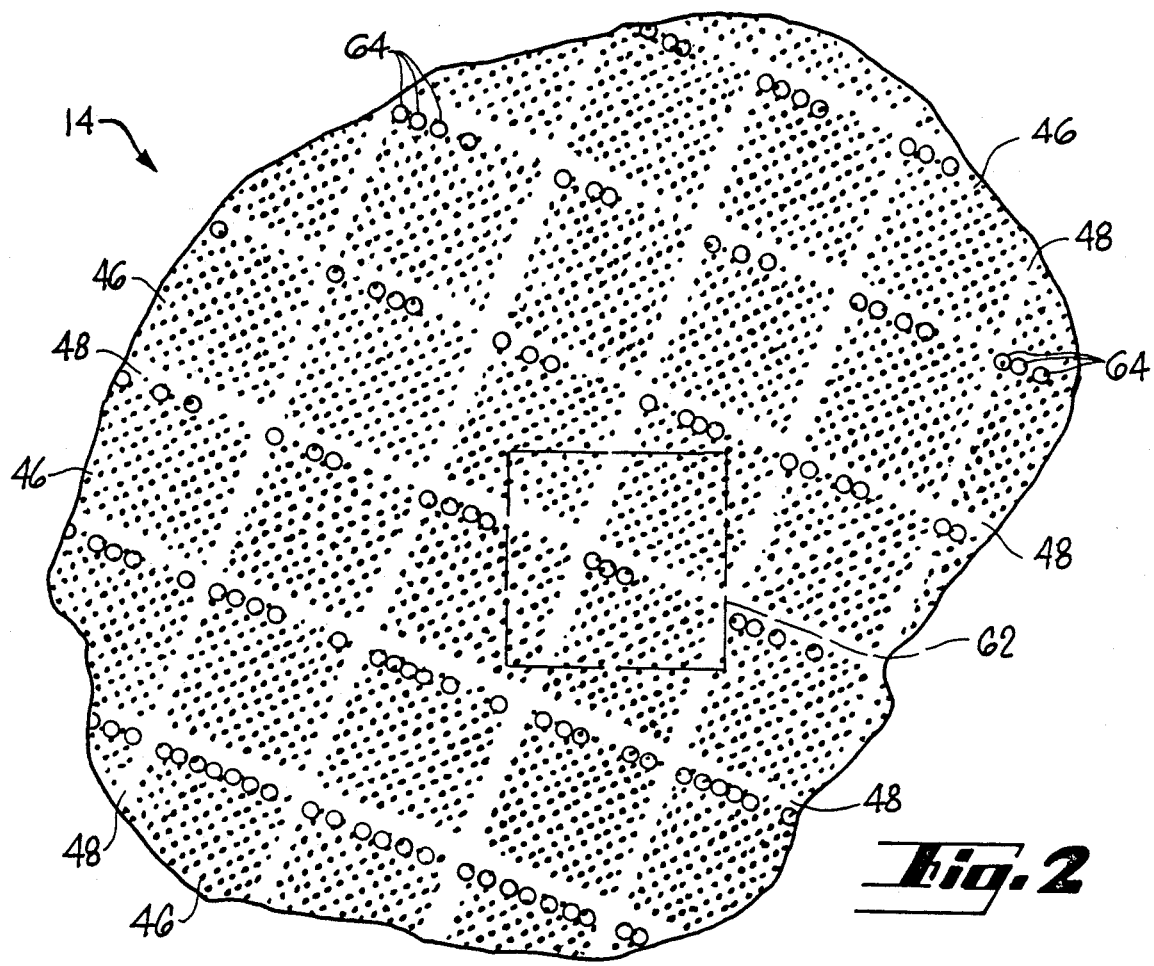
FIG. 2 is a top plan view of a portion of the data surface of FIG. 1.

With reference to FIG. 2, the data field 14 is made up of a plurality of rows and columns of data pages 46. An individual data page 46 may have dimensions of 1 mm × 1 mm, but the size of the data pages is not critical. Each data page 46 is surrounded by CCD alignment-indicating void areas, or streets 48.

Figure 3:
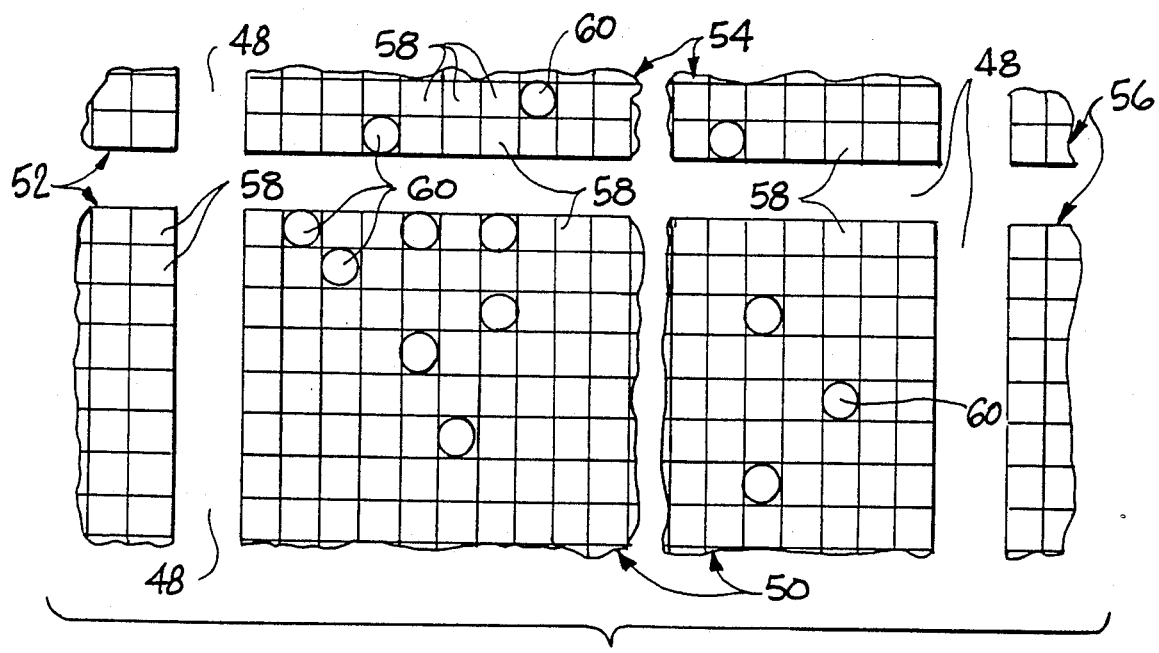
FIG. 3 is a top enlarged view of a portion of the data surface of FIG. 2 showing individual data cells.

FIG. 3 is an enlarged view of four data pages 50, 52, 54 and 56. Each data page 50-56 is comprised of a matrix of data cells 58. The dimensions of the data cells are in the order of 1 micron to up to 100 microns, with 10 microns being a preferred size. Thus, in a data page 50-56 which is 1 mm × 1 mm, the data cells will be arranged in 100 rows each having 100 data cells. Data page 50 is spaced apart from adjacent data pages 52-56 by 100 microns. This 100 micron measurement of the CCD alignment-indicating streets 48 between data pages is not critical but, as will be brought out more fully below, the spacing must be sufficiently wide so that the resultant gap between data pages is a unique empty space which would not be found within a data page. That minimum width is dependent upon the data encoding method selected. With commonly used codes, such as FM or MFM, where the maximum spacing between two adjacent bits is two, then a street width of three would be sufficient. By using data pages 50-56 which are 1 mm × 1 mm and spaced apart by 100 microns, it is possible to provide a card the size of a credit card with more than 2000 data pages arranged in rows and columns.

Referring now to FIGS. 2 and 3, the data cells 58 contain pits, spots or other marks representing data bits, For purposes of illustration, only a few data spots 60 are shown in FIG. 3. The data spots 60 have a reflectivity which contrasts with unrecorded areas of the surrounding data field 14. Preferably, data spots have a reflectivity of less than 10%, while the surrounding field has a reflectivity of about 50%, thus creating a contrast ratio of at least 5 to 1. A contrast ratio of at least 2 to 1 is sufficient for reading. Alternatively, data spots may have greater reflectivity than the surrounding field. Data spot 60 may be circular or oblong in shape.

Dashed box 62 illustrates the dimensions of a CCD area array relative to a data page 46. The CCD area array has a square configuration defined by 600 rows of picture elements, with 600 elements in each row. In comparison, a data page 46 has 100 rows of 100 data cells. It is contemplated that each cell will be read by a plurality of picture elements, whereafter the picture elements will be poled to determine whether or not a data spot 60 exists within a cell. This system minimizes error resulting from crosstalk or other sources by having a plurality of picture elements of the array observe each data cell. The CCD area array should have an areawise field of view greater than the area wise extent of a data page 46, since the array must recognize each street 48 that is adjacent to a data page to be read. However, preferably the area wise extent of the CCD area array does not exceed 1.5 times that of a data page, so that no more than two parallel streets 48 may be viewed by the array at one time.

The storage medium 16 of FIG. 1 is typically constructed of a substrate such as a cellulose acetate polyester film base, polycarbonate, or an Aclar moisture barrier material (ACLAR is a trademark of Allied Chemical), on which a recording layer is disposed. A similar transparent protective layer is provided over the recording layer, which may be any of the recordable materials developed for optical storage such as that disclosed in U.S. Pat. No. 4,284,716 to Drexler et al. and assigned to the assignee of the present invention. Such a recording layer is composed of reflective metal particles in a colloid matrix. Data spots 60 are typically laser recorded, producing spots which are pits in the recording layer. However, other optical data storage materials may be used.

In operation, referring to all of the drawings in general, a CCD area array 18 is positioned apart from and generally parallel to a data field 14 to be read. Processor 38 provides a command signal to control circuit 36 for movement of the motor 26 along the longitudinal slot 34. In addition to the longitudinal slot 32, planar surface 32 includes a cross hatch of slots for movement of motor 26, so that the CCD area array 18 may be positioned opposite any data page 46 in the data field 14. The command signal from processor 38 provides information for movement of the motor 26 to position the array 18 for imaging of a particular data page 46. Thereafter, light source 22 illuminates data field 14 and lens 24 focuses the reflected light onto the CCD area array 18. The resulting image is channeled to the memory 42 via bus line 40. The memory 42 communicates with the processor 38 by way of bus line 44. In this manner an initial imaging is communicated to the processor 38. Each data page includes a unique identifying address 64 in an upper left hand corner. The initial imaging ascertains whether the proper location in reading by the CCD area array has been reached. If the address observed in the initial imaging is not that of the desired data page, new coordinates are computed by the processor 38 for movement of the array 18.

Also observed during the initial imaging is the orientation of the CCD area array 18 relative to the data page 46. Imaging of data must be photometrically and geometrically accurate in imaging the desired data page 46. To this end, streets 48 surrounding the data page will be recognized. Such recognition is used to determine whether the CCD area array 18 is skewed relative to the data page. If correction of the orientation is necessary, the processor 38 transmits a control command to control circuit 36 for rotation of the motion transfer rod 30. The CCD area array 18 is thereby caused to rotate until the peripheral edges of the array are parallel the corresponding sides of the data page to be read. When the entirety of the data page 46 is within the boundaries of the area read by the array 18 and the array is properly aligned, a final image is stored in memory 42.

Positioning of CCD area array 18 relative to a data page 46 may be skewed by almost 45°. In contrast to prior art methods and apparatus, initial positioning of the CCD array 18 need not be kept within tight tolerances. But while the present invention will function even when skew is extreme, in practical applications the skew will typically be less than 1°. Thus, it is possible to image a larger data page in terms of bits and still utilize a given sized CCD area array to read the entire data page.

While the present invention has been illustrated showing ability to linearly and rotationally move the CCD area array, it is understood that the array may be fixed in place and relative movement may be provided by displacement of the storage medium 16. Optionally, rotation of the imaging of a data page may be provided by "rotating" an image in memory.

The data pages 46 have been illustrated as being only a small part of a data field 14. A data page, however, may cover an entire data field, provided that the associated CCD area.array is sufficiently large to recognize the alignment-indicating streets surrounding the data page.

We claim:

1. A method for optically reading data from a substantially planer storage medium comprising, positioning a CCD area array spaced apart from and generally parallel to a storage medium having a substantially rectangular data page, said data page made up of rows and columns of data cells and delimited by streets surrounding said data page, said CCD area array having a substantially rectangular configuration make up of rows and columns of light sensitive detector elements and a field of view greater than the areawise extent of an image of said data page, imaging at least a portion of said data page onto said CCD area array to recognize said streets adjacent said data page, determining the orientation of said data page by recognition of the streets, adjusting, in a rotational manner, the imaging of said data page to obtain a desired image orientation relative to said data page and said CCD area array, said desired image orientation having peripheral edges of said CCD area array generally parallel pith corresponding sides of said data page such that an entirety of said data page imaging is within the peripheral edges of said CCD area array, reimaging the data page onto the CCD area array after said desired image orientation is obtained to produce a final image of the entire data page, each of said data cells imaged by a plurality of said detector elements, some of said data cells containing a data spot which represents a data bit, storing the final image of the entire data page in memory, and polling said plurality of detector elements to determine the existence of a data spot within each of said data cells, whereby each of said data spots determined to exist is read as a data bit.

2. The method of claim 1 wherein said storage medium has a data field segmented into a plurality of pages disposed in rows and columns, each data page spaced apart from adjacent data pages to define streets, said positioning of the CCD array including advancing said CCD array relative to said storage medium in a linear manner.

3. The method of claim 1 wherein said CCD array and said data page each have a rectangular configuration, said adjusting of the imaging of said data page including rotationally aligning the CCD area array such that the sides of the CCD area array are parallel to corresponding sides of the data page.

4. The method of claim 1 wherein one of said CCD area array and said storage medium is stationary and the other is displaced to effect relative linear motion for imaging said data page, whereafter one of said CCD area array and said storage medium is adjusted rotationally to obtain a proper orientation of said CCD area array with respect to said data page.

5. The method of claim 3 wherein the ratio of the area of the CCD area array to the area of a data page is between 1 and 2.

6. The method of claim 1 further comprising storing an image of said data page in memory, said adjusting, in a rotational manner, of the imaging of said data page being a data rotation in memory.

7. A method of optically reading data in a substantially planer data field having a plurality of pages arranged in a series of rows and columns, comprising, positioning a generally rectangular CCD area array to read a first portion of a storage medium having a data field, said data field having a plurality of generally rectangular data pages arranged in rows and columns and delimited from adjacent data pages by streets therebetween, each data page made up of rows and columns of data cells and having an address to distinguish each data page from other data pages, said CCD area array made up of rows and columns of light sensitive detector elements and having an areawise field of view greater than the areawise image of a data page, said CCD area array reading an address of a data page in the first portion of the storage medium, determining relative location of a first data page with respect to the CCD area array from said address read from said first portion of the storage medium, advancing said CCD area array with respect to said storage medium in a manner such that said CCD area array is disposed to read a second portion of said storage medium, said second portion associated with the first data page, imaging said second portion of the storage medium onto said CCD area array to read the address of said first data page and to recognize the streets adjacent said data page, resolving the orientation of said first data page relative to said CCD area array through said recognition of the streets, rotationally adjusting said imaging of the first data page to obtain a desired image orientation, said desired image orientation having peripheral edges of said CCD area array generally parallel with corresponding sides of said first data page such that an entirety the first data page is imaged within the peripheral edges of said CCD area array, reimaging said first data page onto the CCD area array after said desired image orientation is obtained, each of said cells in said first data page imaged by a plurality of detector elements, some of said data cells containing a data spot which represents a data bit, and polling said plurality of detector elements to determine the existence of a data spot within each of said data cells, whereby each of said data spots determined to exist is read as a data bit.

8. The method of claim 7 wherein said rotationally adjusting of the imaging of said first data page includes rotation of one of said CCD area array and said data medium relative to the other.

9. The method of claim 7 further comprising storing an image of said first data page in memory, said rotational adjustment of the imaging including a rotation of said image in memory.

10. The method of claim 7 further comprising advancing said CCD area array relative to said data medium to read a second data page after said first data page has been read.

11. The method of claim 7 further comprising storing an image of said entirety of said first data page in memory from said imaging of the first data page after said desired image orientation is obtained.

12. An optical apparatus for reading data in a data field using a CCD area array, comprising, a planar CCD area array having a generally rectangular two-dimensional grid of light sensitive detector elements arranged in rows and columns, means for holding a data surface in a position apart from and generally parallel to said CCD area array, said data surface having at least one generally rectangular data page dimensionally defined by streets surrounding said data page, said data page having rows and columns of data cells and an image with an areawise extent less than the field of view of said CCD area array, processing means in communication with said CCD area array for receiving an image of said data page and for recognizing said streets adjacent thereto, said processing means having means for determining the orientation of said CCD area array relative to said data surface through recognition of said streets, means operatively associated with said processing means for effecting rotation of said image to compensate for the difference between said orientation of said CCD area array and a desired orientation, said desired orientation having peripheral edges of said CCD area array parallel with corresponding sides of said data page such that an entirety of said data page is imaged within the peripheral edges of said CCD area array, each of said data cells being imaged by a plurality of said detector elements, means for storing the image of the entire data page after the desired orientation has been obtained, and means for polling said plurality of detector elements to determine the existence of a data spot within each of said data cells, said processing means including said means for polling.

13. The apparatus of claim 12 further comprising means for effecting relative linear motion between said CCD area array and said data surface, said data surface including a plurality of data pages, each spaced apart from adjacent data pages by streets to form rows and columns of data pages.

14. The optical apparatus of claim 13 wherein said means for effecting relative linear motion is a drive assembly attached to one of said CCD area array and said data surface.

15. The optical apparatus of claim 12 wherein said means for effecting rotation of said image is a rotational drive assembly attached to one of said CCD area array and said data surface.

16. The optical apparatus of claim 12 wherein CCD area array has a configuration substantially symmetrical to said data page, the ratio of the area of the CCD area array to the area of saidr data page being between 1 and 2.

* * * * *

UNITED STATES PATENT AND TRADEMARK OFFICE
CERTIFICATE OF CORRECTION

PATENT NO. : 4,864,630

DATED : September 5, 1989

INVENTOR(S) : Joseph B. Arnold et al.

It is certified that error appears in the above-identified patent and that said Letters Patent is hereby corrected as shown below:

Abstract, line 10, "takes placed" should read
- - takes place - -.

Column 4, line 46, "data bits," should read - - data bits. - -.

Claim 7, column 7, line 18, "planer data field" should read
- - planar data field - -.

Claim 16, column 8, line 66, "saidr data page" should read
- - said data page - -.

Signed and Sealed this

Fourth Day of February, 1992

Attest:

HARRY F. MANBECK, JR.

Attesting Officer  Commissioner of Patents and Trademarks